Patented Dec. 25, 1951

2,580,290

UNITED STATES PATENT OFFICE 2,580,290

POLYVINYL CHLORIDE PLASTICIZED WITH AN ESTER AND A PETROLEUM EXTRACT

Eric William Musther Fawcett and Albert Millien, Sunbury-on-Thames, England, assignors to Anglo-Iranian Oil Company Limited, London, England, a British joint-stock corporation No Drawing. Application December 8, 1943, Serial No. 513,468. In Great Britain October 28, 1942

Section 1, Public Law 690, August 8, 1946
Patent expires October 28, 1962

1 Claim. (Cl. 260—33.6)

This invention relates to the production of plasticised polyvinyl chloride or polyvinyl chloride co-polymers suitable for use for example as coating compositions, cable dielectric compounds, and moulding compositions.

The employment of such substances as tricresyl phosphate, dibutyl phthalate and dibenzyl sebacate as plasticisers for polyvinyl chloride or its co-polymers has long been practised. These plasticisers are polar in character, and as such are known to have an adverse effect on the electrical and water resistant properties of the polymers. In addition, other physical properties, for example tensile strength are also known to depreciate rapidly with increasing additions of the plasticiser to these polymers.

We have now found that certain hydrocarbons which have good electrical and water resistant properties because of their non-polar character, are compatible with polyvinyl chloride and many polyvinyl chloride co-polymers such as the co-polymers of vinyl chloride with vinyl acetate, methyl acrylate, vinylidene chloride and the like and act as fillers and partial plasticisers in such polymer compositions as are used for moulded and other goods particularly where a highly plasticised and extensible structure is not desired.

It has also been found that these hydrocarbons are compatible with vinyl polymers of the type specifically referred to, incorporated with known plasticisers, as for example, tricresyl phosphate. A considerable saving may thus be effected in these more costly known plasticisers, since large proportions of the hydrocarbons referred to may be used with small proportions of known plasticisers to yield a polymer compound of superior electrical properties and of the plasticity and extensibility normally required in extrusion stocks such as cable insulating compositions.

The invention therefore relates to a method for the production of plasticised polyvinyl chloride or polyvinyl chloride co-polymer compositions, comprising the addition as a filler or as a filler and plasticiser, either alone or with known plasticisers in smaller proportion, of high molecular weight hydrocarbon materials derived or extracted from mineral oil distillates or residues by selective solvents of a polar character, such as sulphur dioxide, sulphur-dioxide benzole mixtures, alcohols, furfural and phenols. The extracted material may be further treated by distillation, selective absorption and desorption on suitable absorptive materials or by other known means prior to admixture with the polymeric substance.

Hydrocarbon materials that may advantageously be used according to the invention are characterised by a high carbon content and thus their molecules contain on the average at least .6 atom of carbon per atom of hydrogen and are generally unsaturated and may contain up to two unsaturated linkages per molecule. The materials may also contain a minor proportion of sulphur and/or nitrogen in combined form. The molecular weight of the hydrocarbons is in the approximate range 200–800 and preferably in the range 250–750, but higher or lower molecular weight materials may be used in particular cases. The initial and final boiling points of the hydrocarbons preferred are in the range 250°–800° C. at 760 mm. Hg. These hydrocarbons are unlike the normal plasticizers employed in known compositions in that they are non-polar and are not oxygenated, and their insulating and dielectric properties and resistance to moisture are much superior to those of plasticisers of a polar character. In addition these new materials, when added to polyvinyl chloride or polyvinyl chloride co-polymers, do not reduce the tensile strength of the polymer to the same extent as a corresponding proportion of a known plasticiser such as those already referred to. These hydrocarbon materials are therefore valuable plasticisers or fillers for polyvinyl chloride polymers since they can be used in large quantities either alone, or as a substitute for the greater part of plasticisers normally used, while imparting superior properties to the products.

According to the invention a mineral oil fraction or residue, generally having an average molecular weight in the range 200–800, is first extracted with a selective polar solvent or a mixture of solvents one at least being of a polar character as for example, a mixture of sulphur dioxide and benzole. The desired hydrocarbons are to be found in the extract phase and are obtained by removal of the solvent by distillation. The extract hydrocarbons after further purification or fractionation may then be incorporated in a polyvinyl chloride, or polyvinyl chloride co-polymer composition. This operation may be carried out in known manner, for example by mechanical mixing or by solution of the polymer and hydrocarbons in a mutual volatile solvent, followed by removal of such solvent either by distillation, or in the case of coating compositions by direct evaporation after the coating operation. Any additional plasticiser such as tricresyl phosphate or solid filling material such as carbon black, whiting or wood flour may be incorporated in the composition in known manner to yield a stock having the necessary physical characteristics for extrusion, moulding or coating.

The following Examples 1 to 3 illustrate the preparation of hydrocarbon materials for use according to the invention, while the remaining Examples 4 to 8 illustrate the practical advantages of the use of those materials.

*Example 1.*—100 parts by volume of a crude petroleum distillate having a boiling range of 360–525° C. at 760 mm. Hg are treated with 200 parts by volume of an 85/15 mixture of sulphur dioxide and benzole at 127° F. The material extracted is then distilled under high vacuum, giving a 30% yield of light coloured hydrocarbon oil which has a boiling range of 400–470° C. at 760 mm. Hg and a mean molecular weight of 330.

*Example 2.*—100 parts by volume of a crude petroleum residue having a boiling range 400–650° C. at 760 mm. Hg are treated with 220 parts by volume of furfural at 130° F. The material extracted is distilled under high vacuum, giving a 25% yield of light coloured hydrocarbon oil having an approximate boiling range of 400–550° C. and a mean molecular weight of 420.

*Example 3.*—100 parts by volume of a crude petroleum distillate having a boiling range of 390–430° C. at 760 mm. Hg were treated with 200 parts by volume of a 90/10 mixture of sulphur dioxide and benzole at 100–120° F. The material extracted having a specific gravity 0.986 at 60° F. was further treated with 300% of sulphur dioxide at −50° F., and the hydrocarbons extracted by this second treatment then distilled under high vacuum to remove a 10% distillate and leave a 10% residue. The 80% middle fraction, equivalent to 7.5% by volume on the original starting material, with a light coloured hydrocarbon oil having a boiling range approximately that of the starting material, a specific gravity of 1.049 at 60° F. and a mean molecular weight of 280.

*Example 4.*—The following table shows the breaking strengths of a series of film compositions, made by the solution method, which are lightly plasticised to yield products having an approximate elongation at break point of 100%. The amounts of plasticisers shown are in parts by weight added to 100 parts by weight of polyvinyl chloride.

| Hydrocarbon material according to the invention | Tricresyl phosphate | Tensile strength, lb./sq. in. |
|---|---|---|
| nil | 36 | 2,000 |
| 30 | 32 | 1,300 |
| 50 | 20 | 1,800 |
| 70 | 10 | 2,000 |

These figures show how the tensile strength may be maintained by the use of large proportions of the hydrocarbon material while effecting a considerable saving in both polyvinyl chloride and expensive plasticisers.

*Example 5.*—The following table shows the tensile strength of a series of compositions made by the solution method which are heavily plasticised to yield products having an approximate elongation at break point of 300%. The amounts of plasticiser shown are in parts by weight added to 100 parts by weight of polyvinyl chloride.

| Hydrocarbon material according to the invention | Tricresyl phosphate | Tensile strength, lb./sq. in. |
|---|---|---|
| nil | 80 | 800 |
| 30 | 50 | 800 |
| 50 | 48 | 1,000 |
| 70 | 40 | 1,600 |

These figures show how an increased tensile strength may be obtained by using large proportions of the hydrocarbon materials prepared for use according to the invention, while effecting a 50% saving in an expensive plasticiser which is known to have an adverse effect on electrical and water resistant properties.

*Example 6.*—The following example illustrates the use of these hydrocarbon materials in polyvinyl chloride compositions mainly as fillers, which maintain a high tensile strength in the product.

| Parts by weight of hydrocarbon materials according to the invention per 100 parts polyvinyl chloride | Parts tricresyl phosphate per 100 parts polyvinyl chloride | Tensile strength, lb./sq. in. |
|---|---|---|
| 20 | nil | 5,000 |
| 40 | nil | 3,200 |
| 60 | nil | 2,400 |
| nil | 20 | 3,400 |
| nil | 40 | 1,800 |
| nil | 60 | 1,200 |

*Example 7.*—This example is illustrative of the use of the hydrocarbon materials incorporated with small proportions of other plasticisers and with a vinyl chloride-vinyl acetate co-polymer prepared by the co-polymerisation of a mixture of 75 parts by weight of polyvinyl chloride and 25 parts by weight of vinyl acetate.

The following table shows figures relating to compositions obtained as films made by the solution method.

| Parts by weight of polymer | Parts by weight of hydrocarbon material according to the invention | Parts by weight of other plasticisers | Tensile strength lb./sq. in. | Elongation at break point per cent |
|---|---|---|---|---|
| 100 polyvinyl chloride | 50 | 20 dibutyl phosphate | 1,580 | 32 |
| 100 polyvinyl chloride | 50 | 30 dibutyl phthalate | 1,470 | 113 |
| 100 polyvinyl chloride acetate co-polymer | 50 | 30 tricresyl phosphate | 1,750 | 102 |

*Example 8.*—This example illustrates the use of these hydrocarbon materials incorporated either alone or with small proportions of other plasticisers in polyvinyl chloride compositions, such as are used for cable insulation and sheathing. The figures given in the following table are on compositions mixed in the normal manner or on a roll mill and subsequently moulded in a platen press at a temperature of about 150° C. The amounts of plasticiser and stabiliser shown are in parts by weight per 100 parts by weight of polyvinyl chloride.

| Hydrocarbon material according to the invention | 100 parts prepared as in Example 3 | 100 parts prepared as in Example 3 | 40 parts prepared as in Example 2 |
|---|---|---|---|
| Dibutyl phthalate | Nil | 20 parts | 40 parts. |
| Lead silicate stabiliser | 5 parts | 5 parts | 5 parts. |
| Tensile strength lb./sq. in | 2,610 | 1,800 | 2,300. |
| Elongation at break, per cent | 280 | 200 | 370. |
| Water absorption after 48 hrs. at 50° C. wt., per cent | 0.20 | 0.81 | 0.34. |
| Volume resistivity ohms per cm. cube | $3.2 \times 10^{14}$ | $6.0 \times 10^{12}$ | $7.1 \times 10^{13}$ |

The invention is generally applicable in the utilisation of polyvinyl chloride and its co-polymers, it being understood that degree of compatibility may be determined in known manner by the practical method of preparing a series of compositions in varying proportions of the hydrocarbon materials by which the limits beyond which the hydrocarbons cease to be compatible may be indicated.

The refined selected hydrocarbons may be thoroughly incorporated in widely varying proportions with or without other known fillers or plasticisers such as tricresyl phosphate commonly used in the production under known conditions of polyvinyl coating compositions, dielectric or insulating compounds and moulding compositions, and the invention is broadly applicable in the use of polyvinyl halides and the polyvinyl chloride co-polymers specified.

We claim:

A plastic composition which comprises polyvinyl chloride plasticized with a plasticizer comprising a compatible ester boiling above 125° C. at 1 mm. Hg pressure and a petroleum extract boiling above 300° C. at 760 mm. Hg pressure obtained by extracting petroleum with a non-reactive highly polar solvent; said polymer containing the same percentage of chlorine as in the polymer when first formed by polymerization, and said composition containing at least 0.7 part by weight of said total plasticizer per part of said polymer; the amount of extract constituting the major proportion of the sum of the amounts of said extract plus said ester, but said proportion being less than that at which the hydrocarbon extract ceases to be compatible in the composition.

ERIC WILLIAM MUSTHER FAWCETT.
ALBERT MILLIEN.

REFERENCES CITED

The following references are of record in the file of this patent:

UNITED STATES PATENTS

| Number | Name | Date |
|---|---|---|
| 1,791,009 | Ostromislensky | Feb. 3, 1931 |
| 1,847,600 | Dunham | Mar. 1, 1932 |
| 1,929,453 | Semon | Oct. 10, 1933 |
| 2,185,951 | Rostler | Jan. 2, 1940 |
| 2,185,952 | Rostler | Jan. 2, 1940 |
| 2,210,434 | Rosenthal et al. | Aug. 6, 1940 |
| 2,217,918 | Rostler | Oct. 15, 1940 |
| 2,217,988 | Lawson | Oct. 15, 1940 |
| 2,220,531 | Lazar | Nov. 5, 1940 |
| 2,334,582 | Read | Nov. 16, 1943 |
| 2,350,007 | Zerbe | May 30, 1944 |
| 2,374,067 | Alderson | Apr. 17, 1945 |

OTHER REFERENCES

Carbide & Carbon Chem. Co., "Vinylite Copolymer Resins for Surface Coating," published December 21, 1942, pp. 1 and 27 (Table 3), and pages 15, 16, 39 and 40.

Plastics Catalog for 1943, published December 21, 1942 by Plastics Catalogue Corp., New York, N. Y., pp. 209 to 211.

Shriner et al., "Identification of Organic Compounds," 2nd Edition, Wiley, 1940, pages 3 to 7.

De Bell et al., "German Plastics Practice," 1946, pages 79 and 91.